United States Patent
Makkar et al.

(10) Patent No.: US 11,829,739 B2
(45) Date of Patent: *Nov. 28, 2023

(54) BLACKBOX MATCHING ENGINE

(71) Applicant: DevFactory Innovations FZ-LLC, Dubai (AE)

(72) Inventors: Tushar Makkar, Ambala (IN); Mukund Mandyam Kannappan, Los Angeles, CA (US)

(73) Assignee: DevFactory FZ-LLC, Dubai Media (AE)

( * ) Notice: Subject to any disclaimer, the term of this patent is extended or adjusted under 35 U.S.C. 154(b) by 0 days.

This patent is subject to a terminal disclaimer.

(21) Appl. No.: 18/046,497

(22) Filed: Oct. 13, 2022

(65) Prior Publication Data
US 2023/0077030 A1    Mar. 9, 2023

Related U.S. Application Data

(63) Continuation of application No. 16/995,082, filed on Aug. 17, 2020, now Pat. No. 11,507,354, which is a (Continued)

(51) Int. Cl.
| | |
|---|---|
| *G06F 8/51* | (2018.01) |
| *G06F 8/36* | (2018.01) |
| *G06F 8/30* | (2018.01) |
| *G06F 9/30* | (2018.01) |
| *G06F 8/41* | (2018.01) |

(Continued)

(52) U.S. Cl.
CPC .............. *G06F 8/51* (2013.01); *G06F 8/311* (2013.01); *G06F 8/36* (2013.01); *G06F 8/37* (2013.01); *G06F 8/447* (2013.01); *G06F 8/48* (2013.01); *G06F 8/72* (2013.01); *G06F 9/30094* (2013.01); *G06F 9/30196* (2013.01); *G06F 9/44* (2013.01); *G06F 11/3664* (2013.01);
(Continued)

(58) Field of Classification Search
CPC . G06F 8/447; G06F 8/311; G06F 8/36; G06F 8/37; G06F 8/48; G06F 8/51; G06F 8/72; G06F 9/453; G06F 9/30094; G06F 9/30196; G06F 9/44; G06F 3/0484; G06F 2009/45591; G06F 11/3664
See application file for complete search history.

(56) References Cited

PUBLICATIONS

Notice of Allowance dated Jul. 13, 2022, filed in U.S. Appl. No. 16/995,082, pp. 1-4.

(Continued)

*Primary Examiner* — Tuan A Vu
(74) *Attorney, Agent, or Firm* — Terrile, Cannatti & Chambers, LLP

(57) ABSTRACT

A method and apparatus are disclosed for enhancing operable functionality of input source code files from a software program by identifying a first code snippet and a first library function which generate similar outputs from a shared input by parsing each and every line of code in a candidate code snippet to generate a templatized code snippet data structure for the first code snippet, and then testing the templatized code snippet data structure against extracted library function information to check for similarity of outputs between the first code snippet and the first library function in response to a shared input so that the developer is presented with a library function recommendation which includes the first code snippet, the first library function, and instructions for replacing the first code snippet with the first library function.

8 Claims, 6 Drawing Sheets

Related U.S. Application Data continuation of application No. 16/172,277, filed on Oct. 26, 2018, now Pat. No. 10,782,946, which is a continuation of application No. 15/782,255, filed on Oct. 12, 2017, now Pat. No. 10,114,624.

(51) Int. Cl.

| | | |
|---|---|---|
| *G06F 8/72* | (2018.01) | |
| *G06F 9/44* | (2018.01) | |
| *G06F 11/36* | (2006.01) | |
| *G06F 3/0484* | (2022.01) | |
| *G06F 9/451* | (2018.01) | |
| *G06F 9/455* | (2018.01) | |

(52) U.S. Cl.
CPC ............ *G06F 3/0484* (2013.01); *G06F 9/453* (2018.02); *G06F 2009/45591* (2013.01)

(56) References Cited

PUBLICATIONS

Terminal Disclaimer filed on Jun. 22, 2022, filed in U.S. Appl. No. 16/995,082, pp. 1-2.
Terminal Disclaimer approved on Jun. 22, 2022, filed in U.S. Appl. No. 16/995,082, p. 1.
Response to Final Office Action dated Jun. 22, 2022, filed in U.S. Appl. No. 16/995,082, pp. 1-7.
Final Office Action dated Feb. 22, 2022, filed in U.S. Appl. No. 16/995,082, pp. 1-8.
Response to Non-Final Office Action dated Dec. 22, 2021, filed in U.S. Appl. No. 16/995,082, pp. 1-7.
Non-Final Office Action dated Jul. 22, 2021, filed in U.S. Appl. No. 16/995,082, pp. 1-7.

BLACKBOX MATCHING ENGINE

BACKGROUND OF THE INVENTION

Field of the Invention

The present invention is directed in general to field of information processing. In one aspect, the present invention relates generally to a software program development tool, method, and apparatus in a data processing system.

Description of the Related Art

Computer programmers, developers, coders and/or software engineers write, test, debug, and maintain computer software or code instructions, called computer programs, which computers must follow to perform their functions. When writing or making changes to computer program to address new or unique technical challenges, programmers often create new, original and unique programming source code which can, unfortunately, suffer from performance limitations and other sub-optimalities. For example, a programmer's unique source code may include a number of undetected software bugs or otherwise suffer from low quality or robustness if the code has not been thoroughly tested, or may have reduced performance functionality if the code is outdated or has not been updated or maintained. Unique source code is often also bloated and less readable than desired due to inefficiencies in the computer program's use of memory, disk space, processing power, or other hardware resources whilst making only dubious user-perceptible improvements or suffering from feature creep. Programmers can address many of these problems by using libraries of basic code that can be modified or customized for a specific application, thereby yielding more reliable and consistent programs and increasing the programmer's productivity. However, there are significant difficulties with using libraries in that a significant amount of effort, knowledge, and experience is needed in order to correctly identify a suitable library from among thousands of stored library files, to understand the performance and coding requirements of the library, and to make any required code adjustments thereto. In addition, the responsibility for using a library typically resides with the programmer or code reviewer, making it difficult to track and enforce library usage. And while the use of libraries is considered a best practice for software development, the existing solutions for promoting library use are extremely difficult at a practical level by virtue of the difficulty in identifying, adopting, and modifying libraries.

SUMMARY OF THE INVENTION

A system, apparatus, and methodology are described for efficiently improving code reuse and improving codebase maintainability by automating the generation of library functions recommendations for replacement or substitution of source code which is written by developers. In selected embodiments, customized code suggestions for library function substitutions are efficiently generated for a programmer's submitted source code by using a matching process to identify source code snippets from the source code which match with library function code suggestions on the basis of shared inputs and outputs. Selected embodiments of the disclosed system, apparatus, and methodology use machine learning, natural language processing (NLP), and/or artificial intelligence (AI) in combination with static and/or dynamic code analysis techniques to automatically analyze code and yield library substitution opportunities. After an optional pruning process to identify candidate code snippets for library suggestion opportunities, candidate code snippets are match processed to identify validated code snippets that may be presented to the programmer with matching library function recommendations for substitution or replacement. Such match processing may be implemented with an input/output matching engine or exact matching engine which injects shared inputs to the input code snippets and the library function method which is called via the library's Java Archive (JAR) file (e.g., blackbox matching), thereby generating validated code snippets which can be replaced by a library function. In selected embodiments, the input/output match processing checks each line of code in a candidate code snippet with a file parser (e.g., a modified. Plyj AST parser) to generate a templatized data structure with extracted information about each code snippet, and then tests the extracted code snippet information against extracted library function code information to check for similarity of outputs between the candidate code snippet and library function code in response to a shared input. As a result of the match processing, the programmer may be presented with one or more library function recommendations which may include code lines from input source code files along with code lines from the library function suggestion, alone or in combination with additional library function information identifying the code improvement recommendation and/or code reduction resulting from the library function recommendation and/or educational tutorial information relating to the implementation of the library function recommendation.

The objects, advantages and other novel features of be present invention will be apparent from the following detailed description when read in conjunction with the appended claims and attached drawings.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

Figure 1:
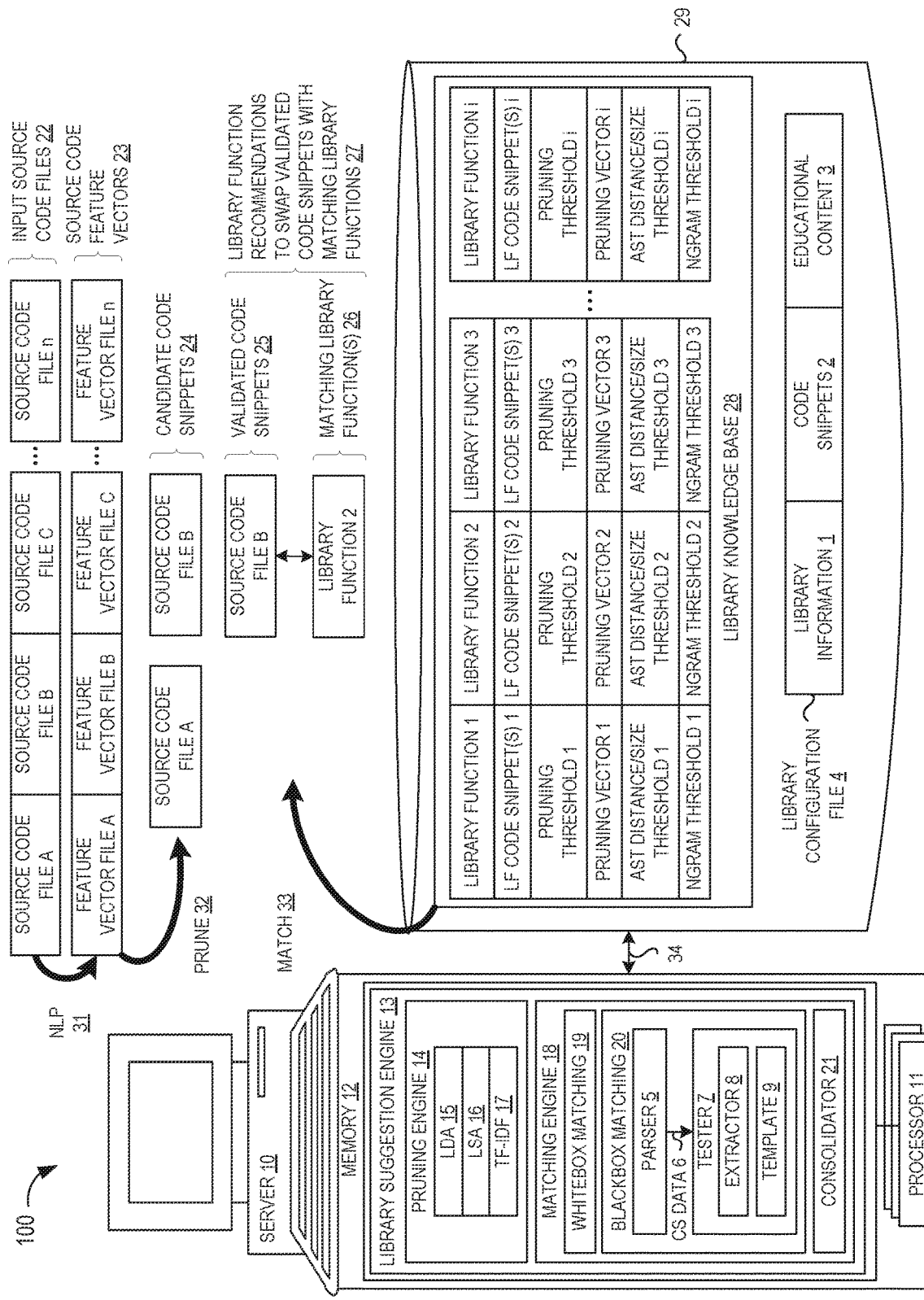
FIG. 1 is a simplified block diagram of a data processing system for generating library function recommendations in accordance with selected embodiments of the present disclosure.

A library suggestion engine, methodology, and apparatus are described for efficiently generating automated library function recommendations to replace input source code written by developers by matching candidate source code snippets from the input source code with corresponding library function code snippets to generate validated code snippets which are recommended for substitution or replacement by matching library function recommendations. As disclosed herein, a blackbox matching process may be used to identify source code snippets and library code snippets which generate similar outputs from a shared input by parsing each and every line of code in a candidate code snippet to generate a templatized code snippet data structure, and then testing the extracted code snippet information against extracted library function code information to check for similarity of outputs between the candidate code snippet and library function code in response to a shared input. The matching source code snippets can be passed to a fuzzy or internal matching engine which reads and analyzes the input source code snippets (e.g., candidate code snippets) for matching with library function code based on their structural and execution flow similarity, thereby generating validated code snippets which can be replaced by a library function. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the data processing arts to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Referring now to FIG. 1, a simplified block diagram illustrates an exemplary data processing system 100 for generating library function recommendations with one or more server/computer systems 10 having processor(s) 11, memory 12, and associated database storage devices 29 which may be connected together over a suitable connection link 34 or network, such as a private wide area network (WAN) or the Internet (not shown). To illustrate the operative functionality of the data processing system 100, the server memory 12 may be used to store the program module functionality for the library suggestion engine 13. As described hereinbelow, the library suggestion engine 13 acts upon the input source code files 22 and/or data from the database storage devices 29 to generate recommendations for replacing source code written by developers with library functions stored in the knowledge base 28. The operation of the library suggestion engine 13 to transform input source code files 22 into validated code snippets 25 for matching with library functions 26 is shown with processing steps 31-33, though it will be appreciated that the underlying data may be stored in the database storage device 29 and/or memory 12.

In selected illustrative embodiments, the server/computer system 10 may include a library suggestion engine 13 that is embodied as a Question Answering (QA) system to use NLP, machine learning, and/or artificial intelligence processing techniques which are augmented with the mechanisms of the illustrative embodiments described hereafter. In a QA system implementation, the library suggestion engine 13 may be embodied as a computer program stored in memory 12 which uses one or more processors 11 to query a structured or unstructured knowledge or information database 29 which includes a library knowledge base 28. Input source code files 22 are available from an external system and/or may be stored in memory 12 and/or in the database storage device 29. Illustrated as being stored in memory 12, the library suggestion engine 13 may be configured to assess input source code files 22 against a library knowledge base 28 for purposes of suggestion library functions as replacement for one or more lines of code from the input source code files. The configuring of the library suggestion engine 13 may include providing application specific hardware, firmware, or the like to facilitate the performance of the operations and generation of the outputs described herein with regard to the illustrative embodiments. In addition or in the alternative, the configuring of the library suggestion engine 13 may include storing software applications in one or more storage devices and loaded into memory of a computing device, such as server 10, for causing one or more hardware processors (e.g., 11) of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

The library suggestion engine 13 may evaluate the input source code files to reduce or prune the number of potential candidate source code snippets for library suggestion by applying natural language processing (NLP) techniques 31 to reduce the processing burden for making library function recommendations. To this end, the library suggestion engine 13 may be provided with a pruning engine 14 for analyzing the input source code files 22 (e.g., Source Code File A, Source Code File B, Source Code File C, . . . Source Code File n) using any suitable technique to identify candidate code snippets 24 (e.g., Source Code File A and Source Code File B) and remove others which are not likely candidates for library function substitution (e.g., Source Code File C and Source Code File n).

As a preliminary step in identifying the candidate code snippets 24, the pruning engine 14 may apply NLP techniques 31 to generate source code feature vectors 23 by checking for the presence of predetermined words in the input source code files 22 and assigning a corresponding weight. For example, the pruning engine 14 may be configured to apply suitable NLP techniques 31 to make the source code feature vectors 23, including but not limited to a tokenization step (which breaks each source code file into words, phrases, symbols and other elements known as tokens), a lowercasing step (which normalizes the source code files by lowercasing them), a stopwords removal step (which removes grammatical words, known as stopwords, and java-specific words from the source code files), a full form conversion step (which converts short form words, such as str or inp, in the source code file to full form, such as string or input), a semantic sense addition step (which adds contextual or semantic information to key words in the source code file, such as adding "loop$" if the keyword is in loop or adding "condition$" if the keyword is inside a conditional statement), a stemming step (which reduces words in the source code file to their root form by removing inflectional word endings), a splitting step (which converts combined words into separate words), and/or a similar sense detection step (which uses Wordnet to add similar words, such as synonyms, to the words in the source code file). In selected embodiments, the pruning engine 14 may also be configured to use an NLP or machine learning process which applies a topical model, such as a Latent Dirichlet Allocation (LDA) module 15 or Latent Semantic Analysis (LSA) module 16, to extract topics in the input source code files 22. In addition, the pruning engine 14 may be configured to use a term frequency-inverse document frequency (TF-IDF) module 17 to identify important keywords in the input source code files 22. Once the important keywords or topics from the input source code files are identified with the LDA, LSA, and/or TF-IDF algorithms, the pruning engine 14 may be configured to combine the results into net result source code feature vectors 23, such as by using a dot product of the priority of each keyword with their priority value found from LSI, LDA, and TF-IDF algorithms, respectively.

Once the source code feature vector files 23 are generated, the pruning engine 14 may be further configured to identify candidate code snippets 24 by applying pruning process 32 to identify candidate code snippets 24 from the input source code files 22 that are likely candidates for library function substitution opportunities. For example, the pruning engine 14 may be configured with a heuristic engine or module which computes a (one time) pruning threshold (e.g., Pruning Threshold 1) for each library function (e.g., Library Function 1) from the library function code snippets (e.g., LF Code Snippet(s) 1) which perform the same or essentially the same function as the library function. In selected embodiments, the pruning threshold may be calculated as the minimum of the dot product of vector achieved from the library function code snippets from permutation of the library knowledge base 28. This pruning threshold and the average vector may then be used to categorize whether a source code file should be further analyzed as a candidate code snippet 24.

To provide additional details for an improved understanding of selected embodiments of the present disclosure for pruning input source code files, the following use case scenario is provided for analyzing two input source code files 22, namely Source Code A=a.java and Source Code File B=b.java. In this example, the first input source code file, a.java, is set forth below:

```
a.java
package example;
class a{
    public static void main(String args[ ]){
        int b;
        String a = "hello";
        b(a);
        System.out.println(a);
    }
}
```

In addition, the second input source code file, b.java, is set forth below:

```
b.java:
package example;
import java.io.*;
import java.io.BufferedReader;
class b {
    public static String readFile(String file) throws IOException {
        /* This function is used for reading a file to string
        */
        BufferedReader br;
        br = new BufferedReader(new FileReader(file));
        StringBuilder sb = new StringBuilder( );
        while(br.ready( )){
            sb.append(br.readLine( ));
            sb.append('\n');
        }
        br.close( );
        return sb.toString( );
    }
}
```

Continuing with this example use case scenario, the NLP processing 31 of the input source files 22 performed by the pruning engine 14 would be used to generate a feature vector consisting of a string of identified keywords or topics, each having an associated or computed weighting factor. For example, a source code feature vector 23 (e.g., Feature Vector File B) for the input source code file 22 (e.g., Source Code File B) would be generated from the sample source code &jam as the following vector structure:

['loop$readi', 0.3247174394233218], ['tostr', 0.3903609231317347], ['loop$append', 0.4470159023826545] ['loop$readlin', 0.46095840978304260], ['builder', 0.5936101105253638], ['readlin', 0.6050065274587427], ['file', 0.6998090230209926], ['stringbuild', 0.7123321326304367], ['append', 0.7481612762292236], ['loop$line', 0.8873805425301969], ['read', 0.9581944056457393], ['bufferedread', 1.659810014435204], ['line', 1.6774363021832421], ['buffer', 1.705919490241575]

Using the source code feature vectors 23, each corresponding source code file 22 is evaluated against the different library functions (e.g., Library Functions 1-i) stored in the library knowledge base 28. To this end, each library function (e.g., Library Function 2) stores basic information about library function, an associated library function code snippet (e.g., LF Code Snippet 2), a pruning threshold value Pruning Threshold 2), a pruning vector (e.g., Pruning Vector 2) specifying a feature vector for the library function, along with additional matching parameters described more fully hereinbelow, such as distance and size threshold values and an Ngram threshold value.

As disclosed herein, the basic library function information for Library Function 2 may include the signature for the library function, a link where the library code is hosted (e.g., github link), the documentation link, educational content, etc. In addition, an example LF code snippet 2 which perform same work as Library Function 2 for apache commons IOUtils to string function can be:

```
public static String lib__readFile12(InputStreamReader is) throws
IOException {
    StringBuilder s = new StringBuilder( );
    BufferedReader br = new BufferedReader(is);
    while (br.ready( )) {
        s.append(br.readLine( )+"\n");
    }
    String s2 = s.toString( );
    br.close( );
    return s2;
}
```

In addition, an example pruning threshold value (e.g., Pruning Threshold 2) and pruning vector (e.g., Pruning Vector 2) for Library Function 2 may be stored in the library knowledge base 28 with the following vector structure:

'apache.commons.io.IOUtils.toString':
  [0.26090225563909775, [[['ngramsi',
  0.0392156862745098], ['array',
  0.05084745762711865], ['add',
  0.05084745762711865], ['outstream',
  0.05172413793103448], ['method$loop$reader',
  0.05298245614035088], ['method$loop$readlin',
  0.05298245614035088], ['method$loop$read',
  0.05298245614035088], ['file_nam',
  0.057167356450603515], ['sock',
  0.0603448275862069], ['data',
  0.06707317073170732], ['arraylist',
  0.06779661016949153], ['loop$file',
  0.06936247840182302], ['hasnextlin',
  0.07407407407407407], ['loop$nextlin',
  0.07407407407407407], ['loop$hasnextlin',
  0.07407407407407407], ['nextlin',
  0.07407407407407407], ['loop$reader',
  0.09126873586033678], ['method$loop$append',
  0.10596491228070176], ['fileinputstream',
  0.11433471290120703], ['list',
  0.11864406779661017], ['fileread',
  0.15390307066222714], ['method$loop$line',
  0.15894736842105261], ['inputstreamread',
  0.2571415633386791], 'scanner',
  0.259259259259259924], ['input',
  0.31993278485297943], ['readi',
  0.3247174394233218], ['loop$readi',
  0.3247174394233218], ['stream',
  0.3544155434736691], ['tostr',
  0.3903609231317347], ['loop$append',
  0.4470159023826545], ['stringbuff',
  0.4587506367647674], ['loop$readlin',
  0.4609584097830426], ['loop$read',
  0.5219340195391402], ['builder',
  0.5936101105253638], ['readlin',
  0.6050065274587427], ['file', 0.6998090230209926],
  ['stringbuild', 0.7123321326304367], ['append',
  0.7481612762292236], ['loop$line',
  0.8873805425301969], ['read',
  0.9581944056457393], ['bufferedread',
  1.659810014435204], ['line', 1.6774363021832421],
  ['buffer', 1.705919490241575], ['reader',
  2.164677513480203]]]]

In this example vector structure, the first term is the pruning threshold (e.g., Pruning Threshold 2=0.26090225563909775), and the remaining vector structure includes a sequence of feature vectors where the first term is a key word or topic from the library function code snippet, and the second term is the strength or weighting factor assigned to the first term. Stated more generally, the pruning vector for a given library function may be represented as: {pruning_threshold, [[keyword_to_search, strength_of_the_keyword_in_given_context]]}.

Similar to the NLP vector processing 31 described above, a unique pruning vector (e.g., Pruning Vector 1-i) for each library function (e.g., Library Functions 1-i) may be generated by applying NLP techniques to identify predetermined words from the corresponding library function/LP code snippet and assign a corresponding weight. Example feature vector algorithms include tokenization steps, lowercasing steps, stopword removal steps, full form conversion steps, semantic sense addition steps, stemming steps, splitting steps, similar sense detection steps, LDA processing steps, LSA processing steps, and/or TF-IDF processing steps.

Continuing with this example use case scenario, the pruning engine 14 may be configured to reduce or filter the input source code files 22 down to a smaller set of candidate code snippets 24 with a pruning process 32 that evaluates the source code feature vectors 23 against library function information in the library knowledge base 28. In the pruning process 32, each source code feature vector 23 may be compared for similarity to the pruning vectors in each library function using a similarity threshold value. For example, the input source code feature vector (e.g., Feature Vector File B) generated from an sample input source code file (e.g., Source Code File B=b.java) may be compared with each of the library function pruning vectors (e.g., Pruning Vectors 1-i) to determine if the sample input source code file (e.g., Source Code File B=b.java) qualifies as a candidate code snippet 24. With these feature vector examples of this use case scenario, the pruning process 32 is applied by the pruning engine 14 to identify Source Code File B=b.java as a candidate code snippet by evaluating Feature Vector File B against the pruning vector (e.g., Pruning Vector 2) for the Library Function 2="apache.commons.io.IOUtils.toString" stored in the library knowledge base 28. This evaluation may be performed as a dot product computation of common terms from Feature Vector File B and Pruning Vector 2 by multiplying the weights for the common terms and summing the results to determine if the resulting value exceeds the pruning threshold (e.g., Pruning Threshold 2=0.26090225563909775). In this case, the dot production computation value is 13.1299337163802074136 and exceeds the value for the Pruning Threshold 2, indicating that the corresponding input source code file (e.g., Source Code File B) qualifies as a candidate code snippet 24. However, if the dot product computation from Feature Vector File C and the library function pruning vectors does not exceed the any of the pruning threshold values for the Library Functions 1-i, then the corresponding input source code file (e.g., Source Code File c) does not qualify as a candidate code snippet 24.

Once the candidate code snippets 24 are identified, the library suggestion engine 13 may read and analyze the candidate code snippets 24 by applying NLP matching techniques 33 to extract features from the candidate code snippets 24 for comparison matching with features extracted from a given library function. To this end, the library suggestion engine 13 may be provided with a matching engine 18 for identifying validated code snippets 25 from the input source code which match with library functions in the library knowledge base 28. In selected embodiments, the matching engine 18 may employ a whitebox matching module 19 to perform fuzzy or internal match processing 33 which reads and analyzes the candidate code snippets 24 to extract predetermined features for matching with the features extracted from a given library function, thereby generating validated code snippets 25 (e.g., from Source Code File B) which can be replaced by a matching library function 26 (e.g., from Library Function 2). In addition or in the alternative, the matching engine 18 may employ a blackbox matching module 20 in which a parser 5, tester 7, extractor 8, and template 9 are used to perform input/output matching by injecting shared inputs to candidate code snippets 24 and library function code snippets to detect matching outputs, thereby generating validated code snippets 25 (e.g., from Source Code File B) which can be replaced by a matching library function 26 (e.g., from Library Function 2).

In selected illustrative embodiments, the blackbox matching engine 20 includes a parser 5 which may be configured to find library suggestion opportunities that are hidden within code segments and not readily recognized at the function level by evaluating each and every line of code from a candidate code snippet and treating them as start and end lines. To this end, the parser 5 may be configured to analyze the Abstract Syntax Tree (AST) of each code snippet (line) while maintaining a symbol table based on the input parameters and the return type of the library functions that may be recommended for replacement. In selected embodiments, the parser 5 may be a Java parser written in Python which extracts predetermined fields from the code snippets, including information about line numbers in the code snippet. While there are a number of Python language parsers, a suitable example of the parser 5 is a modified version of the PlyJ AST parser (e.g., https://github.com/bartdag/py4j) in which selected classes of the PlyJ are overwritten, such as by modifying the FieldDeclarationVisitor, StatementVisitor, and VariableDeclarationVisitor classes of Plyj. In particular, the FieldDeclarationVisitor, StatementVisitor and VariableDeclarationVisitor were modified to incorporate the parsing logic.

To provide additional details for an improved understanding of selected embodiments of the present disclosure for parsing a code snippet, the following use case scenario is provided for using the parser 5 to analyze the following input source code snippet:

```
import java.io.*;
import java.util.*;
import java.net.*;
public class random_code {
   public static String lib_getExtension_0_0(String fileName){
      String extenstion = "";
      int i = fileName.lastIndexOf('.');
      int p = Math.max(fileName.lastIndexOf('\'),
      fileName.lastIndexOf('\\'));
      if (i > p) {
         extension = fileName.substsring(i+1);
      }
      return extension;
   }
   public static int trial(String filename) {
      return filename.lastIndexOf("/");
   }
   public static int lib_indexOfExtenstion_0_0(final String filename) {
      if (filename == null) {
         return -1;
      }
      final int lastUnixPos = trial(filename);
      final int lastWindowsPos = filename.lastIndexOf("\\");
      final int extensionPos = filename.lastIndexOf(".");
      return Math.max(lastUnixPos, lastWindowsPos) > extensionPos
         ? -1 :
         extensionPos;
   }
   public statis String lib_separatorsToUnix_0_1(final String path) {
      if (path.indexOf("\\") == -1) {
         return path;
      }
      return path.replace("\\", "/");
   }
}
```

At the parser 5, code snippet (CS) data 6 is extracted having a predetermined data structure which includes AST data and additional information about the code snippet being evaluated by the blackbox matching module 20. Continuing with the use case scenario provided above, the code snippet data structure 6 extracted by the parser 5 is set forth below:

```
{
   "random_code": {
      "class_variables": {
      },
      "methods": {
         "lib_separatorsToUnix_0_1": {
            "body": " public static String
lib_separatorsToUnix_0_1(final String path) {\n\n if (path.indexOf('\\\\')
== -1) {\n\n return path;\n \n}\n return
path.replace('\\\\', ' / ');\n \n}",
            "parameters": {
               "path": "String"
            },
            "variables": {
            },
            "line_no": 32,
            "method_invocations": [
            ],
            "return_type": "String",
            "snippets": [{
               "snippet": "String path = new String( );\n\n\n
if (path.indexOf('\\\\') == -1) {\n\n String returnTestMethodVar =
path;\n \n}",
                  "method_invocations": [
                  ],
                  "line_no": -1,
```

```
            "type": "String",
            "statement": "\n\n if
(path.indexOf('\\\\') == −1) {\n\n String returnTestMethodVar =
path;\n \n}"
          }, {
            "snippet": "String path = new String( );\n\n\n
if (path.indexOf('\\\\') == −1) {\n\n return path;\n \n}\n
String returnTestMethodVar = path.replace('\\\\', ' / ');",
            "method_invocations": [
            ],
            "line_no": −1,
            "type": "String",
            "statement": "\n String
returnTestMethodVar = path.replace('\\\\', ' / ');"
          }]
        },
        "trial": {
          "body": " public static int trial(String filename)
{\n\n return filename.lastIndexOf(' / ');\n \n}",
          "parameters": {
            "filename": "String"
          },
          "variables": {
          },
          "line_no": 18,
          "method_invocations": [
          ],
          "return_type": "int",
          "snippets": [{
            "snippet": "String filename = new String( );\n\n\n
int returnTestMethodVar = filename.lastIndexOf(' / ');",
            "method_invocations": [
            ],
            "line_no": −1,
            "type": "int",
            "statement": "\n\n int returnTestMethodVar
= filename.lastIndexOf(' / ');"
          }]
        },
        "lib_indexOfExtension_0_0": {
          "body": " \n public static int
lib_indexOfExtension_0_0(final String filename) {\n\n if (filename ==
null) {\n\n return −1;\n \n}\n final int lastUnixPos =
trial(filename);\n final int lastWindowsPos =
filename.lastIndexOf('\\\\');\n final int extensionPos =
filename.lastIndexOf('.');\n return Math.max(lastUnixPos, lastWindowsPos)
> extensionPos ? −1 : extensionPos;\n \n}",
          "parameters": {
            "filename": "String"
          },
          "variables": {
            "lastUnixPos": "int",
            "lastWindowsPos": "int",
            "extensionPos": "int"
          },
          "line_no": 22,
          "method_invocations": [
            "trial"
          ],
          "return_type": "int",
          "snippets": [{
            "snippet": "String filename = new String( );\n\n
final int extensionPos = filename.lastIndexOf('.');\n int
returnTestMethodVar = Math.max(lastUnixPos, lastWindowsPos) > extensionPos ? −1 :
extensionPos;",
            "method_invocations": [
            ],
            "line_no": 6,
            "type": "int",
            "statement": "\n int returnTestMethodVar =
Math.max(lastUnixPos, lastWindowsPos) > extensionPos ? −1 : extensionPos;"
          }, {
            "snippet": "String filename = new String( );\n\n\n
if (filename == null) {\n\n return −1;\n \n}\n final int
lastUnixPos = trial(filename);",
            "method_invocations": [
              "trial"
            ],
            "line_no": 0,
```

```
            "type": "int",
            "statement": "\n Final int lastUnixPos =
trial(filename);"
        }, {
            "snippet": "String filename = new String( );\n\n
final int lastUnixPos = trial(filename);\n final int lastWindowsPos =
filename.lastIndexOf('\\\\');\n final int extensionPos =
filename.lastIndexOf('.');",
            "method_invocations": [
                "trial"
            ],
            "line_no": 4,
            "type": "int",
            "statement": "\n final int extensionPos =
filename.lastIndexOf('.');"
        }, {
            "snippet": "String filename = new String( );\n\n\n
if (filename == null) {\n\n int returnTestMethodVar = −1;\n
\n}",
            "method_invocations": [
            ],
            "line_no": 0,
            "type": "int",
            "statement": "\n\n if (filename == null)
{\n\n int returnTestMethodVar = −1;\n \n}"
        }, {
            "snippet": "String filename = new String( );\n\n\n
if (filename == null) {\n\n return −1;\n \n}\n final int
lastUnixPos = trial(filename);\n final int lastWindowsPos =
filename.lastIndexOf('\\\\');\n final int extensionPos =
filename.lastIndexOf('.');",
            "method_invocations": [
                "trial"
            ],
            "line_no": 0,
            "type": "int",
            "statement": "\n final int extensionPos =
filename.lastIndexOf('.');"
        }, {
            "snippet": "String filename = new String( );\n\n
final int lastWindowsPos = filename.lastIndexOf('\\\\');\n final int
extensionPos = filename.lastIndexOf('.');\n int returnTestMethodVar =
Math.max(lastUnixPos, lastWindowsPos) > extensionPos ? −1 : extensionPos;",
            "method_invocations": [
            ],
            "line_no": 5,
            "type": "int",
            "statement": "\n int returnTestMethodVar =
Math.max(lastUnixPos, lastWindowsPos) > extensionPos ? −1 : extensionPos;"
        }, {
            "snippet": "String filename = new String( );\n\n
final int lastUnixPos = trial(filename);\n final int lastWindowsPos =
filename.lastIndexOf('\\\\');\n final int extensionPos =
filename.lastIndexOf('.');\n int returnTestMethodVar =
Math.max(lastUnixPos, lastWindowsPos) > extensionPos ? −1 : extensionPos;",
            "method_invocations": [
                "trial"
            ],
            "line_no": 4,
            "type": "int",
            "statement": "\n int returnTestMethodVar =
Math.max(lastUnixPos, lastWindowsPos) > extensionPos ? −1 : extensionPos;"
        }, {
            "snippet": "String filename = new String( );\n\n
final int lastUnixPos = trial(filename);\n final int lastWindowsPos =
filename.lastIndexOf('\\\\');",
            "method_invocations": [
                "trial"
            ],
            "line_no": 4,
            "type": "int",
            "statement": "\n final int lastWindowsPos
= filename.lastIndexOf('\\\\');"
        }, {
            "snippet": "String filename = new String( );\n\n\n
if (filename == null) {\n\n return −1;\n \n}\n final int
lastUnixPos = trial(filename);\n final int lastWindowsPos =
filename.lastIndexOf('\\\\');",
            "method_invocations": [
```

```
                "trial"
            ],
            "line_no": 0,
            "type": "int",
            "statement": "\n final int lastWindowsPos
= filename.lastIndexOf('\\\\');"
        }, {
            "snippet": "String filename = new String( );\n\n\n
if (filename == null) {\n\n return −1;\n \n}\n final int
lastUnixPos = trial(filename);\n final int lastWindowsPos =
filename.lastIndexOf('\\\\');\n final int extensionPos =
filename.lastIndexOf('.');\n int returnTestMethodVar =
Math.max(lastUnixPos, lastWindowsPos) > extensionPos ? −1 : extensionPos;",
            "method_invocations": [
                "trial"
            "line_no": 0,
            "type": "int",
            "statement": "\n int returnTestMethodVar =
Math.max(lastUnixPos, lastWindowsPos) > extensionPos ? −1 : extensionPos;"
        }, {
            "snippet": "String filename = new String( );\n\n
final int lastWindowsPos = filename.lastIndexOf('\\\\');\n final int
extensionPos = filename.lastIndexOf('.');",
            "method_invocations": [
            ],
            "line_no": 5;
            "type": "int",
            "statement": "\n final int extensionPos =
filename,lastIndexOf('.');"
        }]
    },
    "lib_getExtension_0_0": {
        "body": " public static String
lib_getExtension_0_0(String fileName){\n\n String extension = ' ';\n
int i = fileName.lastIndexOf(\".\");\n int p =
Math.max(fileName.lastIndexOf(\"/\"), fileName.lastIndexOf(\"\\\\\"));\n\n
if (i > p) {\n\n extension = fileName.substring(i+1);\n \n}\n
return extension;\n \n}",
        "parameters": {
            "fileName": "String"
        },
        "variables": {
            "i": "int",
            "p": "int",
            "extension": "String"
        },
        "line_no": 7,
        "method_invocations": [
        ],
        "return_type": "String",
        "snippets": [{
            "snippet": "String fileName = new String( );\n\n
String extension = ' ';\n int i = fileName.lastIndexOf(\".\");\n int
p = Math.max(fileName.lastIndexOf(\"/\"), fileName.lastIndexOf(\"\\\\\"));\n\n
if (i > p) {\n\n extension = fileName.substring(i+1);\n \n}",
            "method_invocations": [
            ],
            "line_no": −1,
            "type": "String",
            "statement": "\n\n if (i > p) {\n\n
extension = fileName.substring(i+1);\n \n}"
        }, {
            "snippet": "String fileName = new String( );\n\n
int i = fileName.lastIndexOf('.');\n int p =
Math.max(fileName.lastIndexOf(' / '), fileName.lastIndexOf('\\\\'));\n\n
if (i > p) {\n\n extension = fileName.substring(i+1);\n \n}\n
String returnTestMethodVar = extension;",
            "method_invocations": [
            ],
            "line_no": 1,
            "type": "String",
            "statement": "\n String
returnTestMethodVar = extension:"
        }, {
            "snippet": "String fileName = new String( );\n\n
String extension = ' ';\n int i = fileName.lastIndexOf(\".\");",
            "method_invocations": [
            ],
            "line_no": −1,
```

```
                "type": "int",
                "statement": "\n int i =
fileName.lastIndexOf('.');"
            }, {
                "snippet": "String fileName = new String( );\n\n\n
if (i > p) {\n\n extension = fileName.substring(i+1);\n \n}\n
String returnTestMethodVar = extension;",
                "method_invocations": [
                ],
                "line_no": 3,
                "type": "String",
                "statement": "\n String
returnTestMethodVar = extension;"
            }, {
                "snippet": "String fileName = new String( );\n\n\n
String extension = '';\n int i = fileName.lastIndexOf(\".\");\n int
p = Math.max(fileName.lastIndexOf(\"/\"), fileName.lastIndexOf(\"\\\\\"));",
                "method_invocations": [
                ],
                "line_no": -1,
                "type": "int",
                "statement": "\n int p =
Math.max(fileName.lastIndexOf(' / '), fileName.lastIndexOf('\\\\'));"
            }, {
                "snippet": "String fileName = new String( );\n\n
int p = Math.max(fileName.lastIndexOf('/ '), fileName.lastIndexOf('\\\\'));\n\n
if (i > p) {\n\n extension = fileName.substring(i+1);\n \n}",
                "method_invocations": [
                ],
                "line_no": 2,
                "type": "String",
                "statement": "\n\n if (i > p) {\n\n
extension = fileName.substring(i+1);\n \n}"
            }, {
                "snippet": "String fileName = new String( );\n\n
int p = Math.max(fileName.lastIndexOf(' / '), fileName.lastIndexOf('\\\\'));\n\n
if (i > p) {\n\n extension = fileName.substring(i+1);\n \n}\n
String returnTestMethodVar = extension;",
                "method_invocations": [
                ],
                "line_no": 2,
                "type": "String",
                "statement": "\n String
returnTestMethodVar = extension;"
            }, {
                "snippet": "String fileName = new String( );\n\n
int i = fileName.lastIndexOf('.');\n int p =
Math.max(fileName.lastIndexOf(' / '), fileName.lastIndexOf('\\\\'));",
                "method_invocations": [
                ],
                "line_no": 1,
                "type": "int",
                "statement": "\n int p =
Math.max(fileName,lastIndexOf(' / '), fileName.lastIndexOf('\\\\'));"
            }, {
                "snippet": "String fileName = new String( );\n\n
int i = fileName.lastIndexOf('.');\n int p =
Math.max(fileName.lastIndexOf(' / '), fileName.lastIndexOf('\\\\'));\n\n
if (i > p) {\n\n extension = fileName.substring(i+1);\n \n}",
                "method_invocations": [
                ],
                "line_no": 1,
                "type": "String",
                "statement": "\n\n if (i > p) {\n\n
extension = fileName.substring(i+1);\n \n}"
            }, {,
                "snippet": "String fileName = new String( );\n\n\n
String extension = '';",
                "method_invocations": [
                ],
                "line_no": -1,
                "type": "String",
                "statement": "\n\n String extension = ';"
            }, {
                "snippet": "String fileName = new String( );\n\n\n
String extension = '';\n int i = fileName.lastIndexOf(\".\");\n int
p = Math.max(fileName.lastIndexOf(\"/\"), fileName.lastIndexOf(\"\\\\\"));\n\n
if (i > p) {\n\n extension = fileName.substring(i+1);\n \n}\n
String returnTestMethodVar = extension;",
```

-continued

```
        "method_invocations": [
        ],
        "line_no": -1,
        "type": "String",
        "statement": "\n String
returnTestMethodVar = extension;"
        }]
      }
    }
  }
}
```

Stated more generally, the extracted code snippet data structure 6 has the following structure:

```
{'<class_name>': {'class_variables': {'<variable_name>': '<variable_type>',...},
   'methods': {'<method_name>': {'body': '<body>',
                                 'line_no': '<line_no>',
                                 'method _invocations':
['<method_name>',...],
                                 'parameters':
{'<variable_name>': '<variable_type>',...},
                                 'return_type':
'<return_type>',
                                 'snippets': [{'line_no':
'<line_no>', 'snippet': '<snippet>',
'method_invocations': ['<method_name>',...],
'statement': '<last_statement>',
                                 'type':
'<expected_return_type>'},...]},...]}
```

As seen from the foregoing, the AST parser 5 may extract the following fields from the code snippet for output as the code snippet data structure 6:
Class Name
Class Variables
Variables
   Variable Name
   Variable Type
Methods
   Method Name
   Body of Method
   Starting Line Number
   Method Invocations I.e all the methods which are called from it
   Parameters
   Return type
   Snippets
Snippets:
   Starting Line number
   Snippet
   Method Invocations
   Statement to analyze
   Expected return type of the snippet Once generated by the parser 5, the code snippet data structure 6 is then passed to the blackbox tester unit 7 to provide information about the code snippet being evaluated. In addition, the blackbox tester unit 7 receives information about the library function(s) being evaluated for input/output matching with the code snippet. With this information, the blackbox tester unit 7 evaluates the appropriateness of substituting the code snippet with a library function by injecting a shared input and comparing the resulting outputs from the code snippet and a library function. To this end, the tester unit 7 may include an extractor 8 and template engine 9 which are used to extract all the basic imports used in the code snippet file being analyzed and to templatize the code snippet extracted by forming appropriate class with function definition. Once this information is assembled, the blackbox tester unit 7 checks the compilability of the code snippet and injects input into the code snippet and the library function to determine if the outputs yielded are similar to one another.

In accordance with selected embodiments of the present disclosure, the extractor 8 may include program code and/or modules for use in processing the code snippet data 6 generated by the parser 5 to automatically generate information about the code snippet being evaluated for use by the blackbox tester unit 7. As disclosed herein, the extractor 8 may be coupled to provide the tester 7 with the code snippet, code snippet return type, snippet variables, and variable type which may be extracted from the code snippet data 6. In addition, the program code/modules in the extractor 8 may be used to automatically generate information about the library function being evaluated for use by the blackbox tester unit 7. As disclosed herein, the extractor 8 may be coupled to receive program inputs, including information describing each library function or model 1, functionally similar code snippets 2, and education content 3, that are available from an external system and/or may be stored in memory 12 and/or in the database storage device 29. Illustrated as being stored in memory 12, the library suggestion addition engine 13 may be configured to onboard a library model with a user interface input screen to enter the information about the library function as a library information 1, code snippets 2, and education content 3 contained in a library configuration file 4 using a YAML-based file format. Each library configuration file 4 represents the data needed to recognize a single function in the library knowledge base 28, and should not include multiple function configurations. In selected embodiments, the library configuration file 4 may be automatically generated into a human-readable format which is parsable by software (e.g., YAML) by using the extractor 8 to extract, scrape, or otherwise construct the library configuration file 4 by populating one or more of the following sections:

Name of the library (e.g., library_name),
Name of the library function (e.g., library_function_name),
Library Descriptors which mention the property of a particular library function,
Online link to the documentation page for the library function (e.g., documentation_link), logo image link (e.g., logo_image_link), library code link (e.g., library_code_link), and/or maven link (e.g., maven_link),
Signature of the library (e.g., Method Parameter Names, Imports, Return Type, and Method Parameter Types),
One or more custom inputs (e.g., custom_inputs) that can be passed to the library functions,
Expected outputs,
Autogenerated Inputs,
Autogenerated Outputs,
File Data,
Third Party JARs,
Transform functions for converting complex type to simple type (e.g., transform function mapping, transform function parameters, transform function imports, and transform function Code),
A list of conditions (e.g., equal_function_True) that will determine a valid match when the expression evaluates to True,
A list of conditions (e.g., equal_function_False) that will determine a valid match when the expression evaluates to False, and
One or more functionally similar code snippets (e.g., code_snippets) that will help establish a pattern for the code.

To provide additional details for an improved understanding of selected embodiments of present disclosure, the following use case scenario provides a sample of the library function information extracted by the extractor 8 from a YAML-formatted library function, Apache Commons IOUtils.toString:

```
class toString0:
    name = "org.apache.commons.io.IOUtils.toString"
    signature = {\'method_parameter_names\': [\'testMethodInput_0\'],
\'imports\': [\'java.util.*\', \'java.math.*\', \'java.net.*\', \'java.io.*\'],
\'return_type\': \'java.lang.String\', \'method_parameter_types\':
[\'java.io.Reader\']}
    inputs = [[{\'input_value\': [\'FILE(file_data[0])\'], \'type\':
[\'java.lang.String\'], \'transform_function\': \'get_Reader_from_String\'}],
[{\'input_value\': [\'FILE(file_data[1])\'], \'type\': [\'java.lang.String\'],
\'transform_function\': \'get_Reader_from_String\'}]]
    expected_outputs = [u\'This is the first line\', u\'This is the second
line\\\
It has 2 lines..\']
    auto_generated_inputs = [\'("sample_data/futurama.txt")\']
    auto_generated_outputs = [u\'Futurama is an American adult animated science
fiction sitcom created by Matt Groening for the Fox Broadcasting Company. The
series follows the adventures of a late-20th-century New York City pizza delivery
boy, Philip J. Fry, who, after being unwittingly cryogenically frozen for one
thousand years, finds employment at Planet Express, an interplanetary delivery
company in the retro-futuristic 31st century. The series was envisioned by
Groening in the late 1990s while working on The Simpsons, later bringing Cohen
aboard to develop storylines and characters to pitch the show to Fox.\
\
In the United States, the series aired on Fox from March 28, 1999, to August 10,
2003, before ceasing production. Futurama also aired in reruns on Cartoon
Network\\\'s Adult Swim from 2002 to 2007, until the network\\\'s contract
expired. It was revived in 2008 as four direct-to-video films; the last of which
was released in early 2009. Comedy Central entered into an agreement with 20th
Century Fox Television to syndicate the existing episodes and air the films as 16
new, half-hour episodes, constituting a fifth season.\
\
In June 2009, producing studio 20th Century Fox announced that Comedy Central had
picked up the show for 26 new half-hour episodes, which began airing in 2010 and
2011. The show was renewed for a seventh season, with the first half airing in
June 2012 and the second set for early summer 2013. It was later revealed that
the seventh season would be the final season, as Comedy Central announced that
they would not be commissioning any further episodes. The series finale aired on
September 4, 2013, officially ending the series. While Groening has said he will
try to get it picked up by another network, David X. Cohen stated that the
episode "Meanwhile" would be the last episode of season 7 and also the series
finale.\']
    auto_generated_imports = [\'java.io.IOException\',
\'java.text.MessageFormat\', \'java.io.ByteArrayOutputStream\',
\'java.util.List\', \'java.net.*\', \'java.io.ByteArrayInputStream\',
\'java.io.Writer\', \'java.io.OutputStreamWriter\',
\'java.nio.channels.FileChannel\', \'java.util.HashMap\', \'java.io.*\',
\'java.util.Map\', \'java.nio.channels.Selector\', \'java.io.InputStream\',
\'java.nio.ByteBuffer\', \'java.util.Arrays\']
    file_data = [\'This is the first line\', \'This is the second line\\\
It has 2 lines..\']
    third_party_jars = [ ]
    transform_function_mapping = {\'java.io.Reader\': [\'java.lang.String\']}
    transform_function_parameters = [\'java.io.Reader\']
    transform_function_imports = {\'built_in\': [\'java.io.*\']}
    transform_function_code = [\'public static Reader
get_Reader_from_String(String filename) throws IOException {\
    File fileName = new File(filename);\
```

```
    Reader reader = new FileReader(fileName);\
    return reader;\
  }\
\']
  def __init__(self):
    raise TypeError(\'Cannot Instantiate\')
  @staticmethod
  def equals(output, expected_output):
    if output == expected_output or output.strip( ) ==
expected_output.strip( ):
      return True
    elif output != expected_output and output is None or expected_output is
None:
      return False
    else:
      return False
```

Using the snippet information (extracted automatically by the parser and the library information (extracted automatically by the extractor 8) as inputs, the tester 7 processes these inputs to identify source code snippets from the source code which match with library function code suggestions on the basis of shared inputs and outputs. In selected embodiments, the processing at the tester 7 first checks if the snippet's return type (from the parser 5) matches the return type of the library function (from extractor 8). In addition, the template engine 9 generates templates for a given code snippet by first checking which variables are being used in the code snippet and then checking if the parameters which are passed to the library function being evaluated can be fit in the variables used by the code snippet. If the passed library function parameters do not fit in the snippet's used variables, then the template is removed, but if they fit, then the template engine 9 replaces the generated template with a generic type template.

To provide additional details for an improved understanding of selected embodiments of present disclosure, the following use case scenario provides an example generic template for blackbox matching:

```
{% for import in imports %}
import {{import}};
{% endfor %}
public class {{ class_name }} {
    {% for member in class_variables %}private {{ member[1] }} {{ member[0] }};
    {% endfor %}
    {% for method in method_invocations %} {{ method }}
    {% endfor %}
    public {{ return_type }} testMethod({{ method_parameters | join(',
') }}) throws Exception {
        {{ method_body }}
    }
}
```

As will be appreciated, the foregoing generic template example is compatible with a Python template engine, such as Jinja or Jinja2. In addition, a recursive solution can be readily constructed for checking where to fill in the parameters in the template. Once the template for parameters is formalized, the custom inputs (from the code snippet) and the extracted inputs (from the library) may be injected (e.g., by using the parser 5), and the result is then equalized using an "equals" function. If the tester 7 determines that the ratio of the number of inputs to the equated outputs is above a specified threshold (e.g., >50%), then the blackbox matching engine 20 send the matching code snippet and library function to the consolidator 21 where the results are consolidated with the matching results from the whitebox matching engine 19.

To improve the matching functionality of the blackbox matching engine 20, the template engine 9 may be configured to generate more generic templates by replacing non-generic types with generic types. For example, equivalents can be addressed with the following instruction:

'Reader': [{'name': 'BufferedReader', 'replacements': ['BufferedReader({{Reader}})']}]

By generating more generic templates, the probability of making the code snippets compliable is increased. In addition, the addition of basic variables type and class variables and other function definition in the template also help make the code compilable.

In accordance with selected embodiments of the present disclosure, the extractor 8 may include program code and/or modules for use in automatically generating library function test cases for use in performing input/output matching at the blackbox matching engine 20. In particular, the extractor 8 may be coupled to retrieve the library model source code from the library knowledge base 28 and/or online URL link to the documentation page which may be extracted from the library configuration file 4. The library model source code is then scraped using the extractor 8 which identifies test files using a plurality of test file parameters. In selected embodiments, the extractor 8 checks for files with a "test" keyword parameter in the absolute path name of the file, and may also check if a particular type of test library (e.g., Junit) is used or imported in the test file. While these parameters provide good performance in detecting whether a file includes test cases or not, it will be appreciated that other test file parameters may be used. Whichever test file parameters are used, the extractor 8 may be configured to scrape the pruned test files to extract test case input parameters which are passed to auto-generated code which calls the library knowledge base 28 (e.g., with a JAR) and then generates test case outputs corresponding to the extracted library function custom inputs retrieved from the library knowledge base 28. By automating this approach to identify test cases present in the documentation, the developer is relieved from the burden of searching for test cases and more reliable test cases can be identified for inclusion in the library configuration file 4.

As illustrated, the test case outputs may be provided as inputs to the extractor 8 which extracts functionally similar code snippets using any suitable code snippet generation technique. For example, the test case outputs from the extractor 8 may be processed by the blackbox matching engine 20 which performs input/output matching to inject the test cases into codes stored at a repository of open source code bases. As a result, the blackbox matching engine 20 can automatically identify functionally similar code snippets as the sample code snippets 2 in the library configuration file 4 for the candidate library model. With this approach, the developer is relieved from the burden of searching for code bases and identifying promising code snippets that can be used for internal or fuzzy matching evaluation of candidate library models.

Once the matching library functions 26 are identified, the library suggestion engine 13 may present library function recommendations 27 to the program developer with suggestions for swapping the validated code snippets 25 with the matching library functions 26. In selected embodiments, a library function recommendation 27 may include the validated source code snippets from the input source code files (e.g., Source Code File B) along with a visual indication that suggests a library function (e.g., Library Function 2) for replacement or substitution. For example, a first user interface display screen may show an input source code file (e.g., Source Code File B) with the validated code snippet 25 highlighted or otherwise visually set off from the remaining lines of code in the input source code file, such as by including a user interaction link which opens a second user interface display screen to show information relating to the matching library function 26 (e.g., Library Function 2).

As will be appreciated, once the server/computer system 10 is configured to implement the library suggestion engine 13, the server/computer system 10 becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates the generation of library function recommendations for a program developer by pruning input source code 22 into candidate code snippets 24 which are then matched as validated code snippets 25 with corresponding library functions 26 based on a measure of fuzzy and/or input/output matching similarity for presentation to the program developer as library function recommendations 27.

Figure 2:
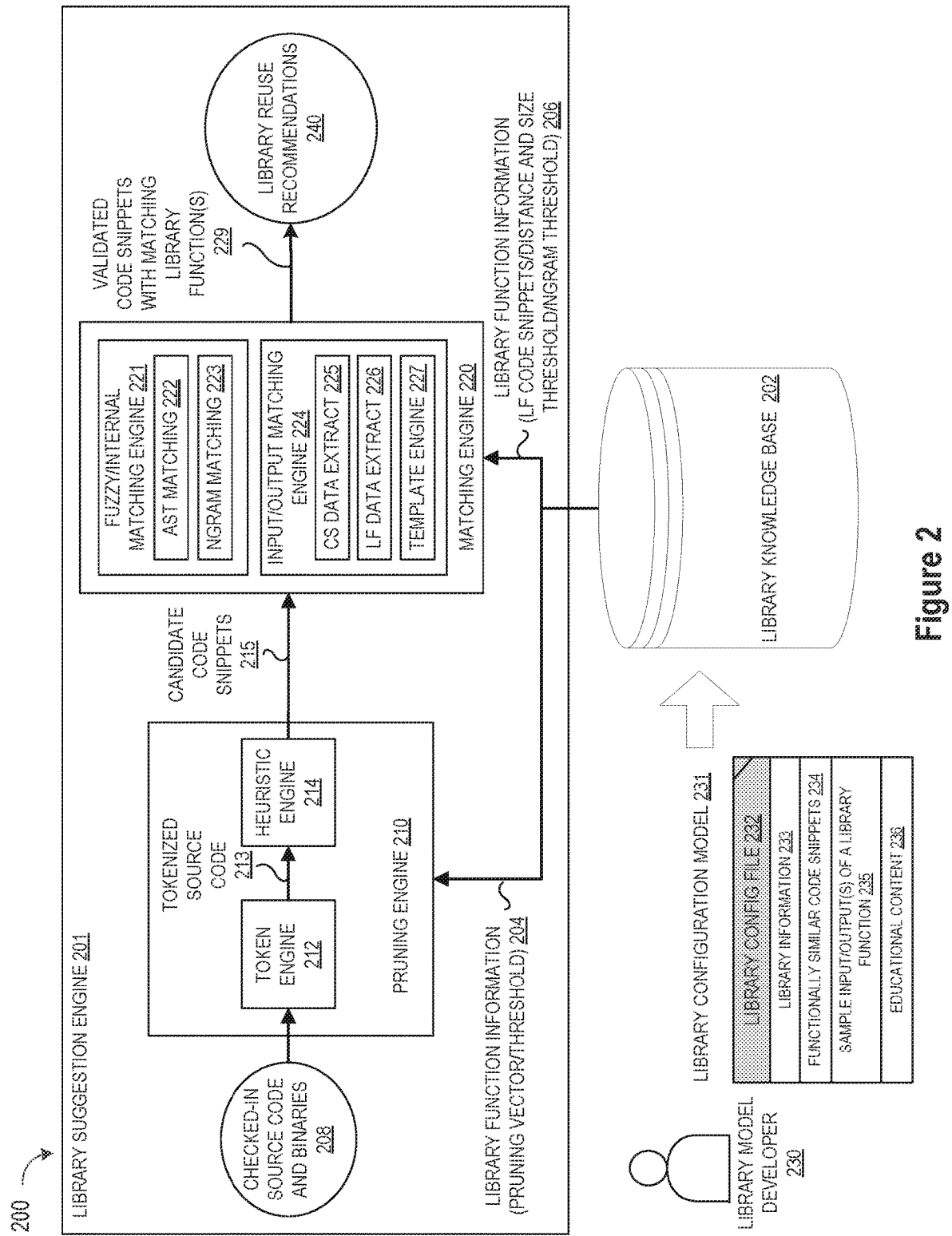
FIG. 2 illustrates a library model suggestion workflow for generating library reuse recommendations in accordance selected embodiments of the present disclosure.

To provide a contextual understanding for selected embodiments of the present disclosure, reference is now made to FIG. 2 which illustrates a library model suggestion workflow 200 for generating library reuse recommendations 240 from input source code and binaries 208 in accordance selected embodiments of the present disclosure. In selected embodiments, the depicted workflow 200 may be implemented in whole or in part with a data processing system (such as shown in FIG. 1) and/or a single integrated circuit (e.g., a system-on-chip) or a plurality of integrated circuits to implement one or more processors with local memory and database storage that are interconnected and interoperate using any suitable techniques without departing from the present invention.

However implemented, the workflow 200 receives input code (block 208) hick may be checked into the system as source code and binary files created by the program developer. An additional input to the work flow 200 is the library function information 204 provided by the library knowledge base 202 which stores library function information, code snippets which perform the same work as a library function, pruning threshold and pruning vector information, distance and size threshold information, and Ngram threshold information. To manage and curate the library function information 204 in the library knowledge base 202, the library model developer 230 may submit configuration files 232 which represent the data needed to recognize each library function in the library. For example a configuration file for a single library function may include the name of the library (e.g., library_name), the name of the library function (e.g., library_function_name), library descriptors information (e.g., information specifying the property of a particular library function), an http url link to the documentation (e.g., documentation_link), a method signature (e.g., signature), one or more custom inputs that can be passed to the library functions, one or more transform functions for converting complex type to simple type, a list of conditions that will determine a valid match when the expression evaluates to True (e.g., equal_function_True), a list of conditions that will determine a valid match when the expression evaluates to False (e.g., equal_function_False), and or more code snippets that will help establish a pattern for the code (e.g., code_snippets). In this way, the library knowledge base 202 has only the best of library functions, and can also support customized library code for customer needs so that they can import their particular library usage within their organization.

Upon check-in to the workflow 200, the input code is pruned or parsed by the pruning engine 210 to identify candidate code snippets for library suggestion opportunities. While any suitable pruning approach may be used, selected embodiments may employ a tokenization engine 212 which uses NLP processing to break the input code into tokens 213 (e.g., tokenized source code) which are passed to the heuristic engine 214. The heuristic engine 214 is also connected to receive library function information 204 from the library knowledge base 202 which stores data that may be curated and standardized according to frequency in terms of usage, number of issues, commits, contributions, and various other factors. In selected embodiments, the heuristic engine 214 pools the tokens into candidate code snippets 215 using various techniques, such as polygraph, latency, and indexing, LDA, etc. The resulting candidate code snippets 215 are then passed to a matching engine 220 which is in turn composed of two different engines a fuzzy or internal matching engine 221 and an input/output matching engine 224.

Fuzzy/Internal or Whitebox Matching

At the fuzzy/internal matching engine 221 (also referred to as a "whitebox matching" engine), each received candidate code snippet 215 is processed for matching with library feature vectors from the library function information 206 based on their structural and execution flow similarity. To this end, the fuzzy/internal matching engine 221 may be provided with an Abstract Syntax Tree (AST) matching algorithm 222 for identifying validated code snippets from the input source code which match with library functions in the library knowledge base 202. In selected embodiments, the AST matching algorithm 222 may employ a syntax tree to represent the abstract syntactic structure of the candidate code snippets 215 and library function code snippets 206 from the library knowledge base 202 that are written in a source code programming language. Each node of the tree denotes a construct occurring in the source code. In addition, the syntax is "abstract" in not representing every detail appearing in the real syntax. For instance, grouping parentheses are implicit in the tree structure, and a syntactic construct like an if-condition-then expression may be denoted by means of a single node with three branches. In selected embodiments, the AST matching algorithm 222 may be embodied with the Clone Digger duplicate code detection tool which performs anti-unification analysis of the AST of the library function code snippets 206 and the candidate code snippets 215 being validated. In operation, the AST matching algorithm 222 constructs an abstract syntax tree (AST) for each code snippet being analyzed in any desired source code language, such as Python, Java, and other programming languages, such as Java 8. For example, the AST matching algorithm 222 may be implemented by creating a wrapper on top of Clone Digger to extend the AST matching for Java 8 code snippets with improved accuracy and efficiency.

For improved accuracy for of the AST matching algorithm 222, the AST size threshold and distance threshold values may be adjusted or tweaked for each different library function, and then stored while onboarding any new library function in the library knowledge base 202 for automated usage. As will be appreciated, the AST size threshold value specifies the minimum size of the nodes in each abstract syntax tree, while the AST distance threshold values specifies the maximum distance which is allowed for two ASTs to qualify as matching. In accordance with the present disclosure, the AST distance threshold value for each library function may be calculated from the library function code snippets in the library knowledge base 202 which are permuted and applied to the Clone Digger anti-unification algorithm. In addition, the AST size threshold value may be calculated as the minimum number of nodes in the library knowledge base 202 multiplied by a constant factor which is less than 1. The Clone Digger tool used to implement the AST matching algorithm 222 may also be modified to allow changes to the variable name and function name parameters and/or to remove the report generation feature.

Continuing with an example use case scenario to illustrate how the fuzzy or internal matching engine 221 compares features from a candidate code snippet 215 and library function code snippet 206, the AST matching algorithm 222 is used to construct an AST for each candidate code snippet 215 and library function code snippet 206 and then apply a clustering algorithm to find similar code snippets, such as by using the ant-unification algorithm from the Clone Digger implementation of the AST matching algorithm 222. In addition, Ngram matching algorithm 223 is used to break the candidate code snippet (e.g., Source Code File B=b.java) into class and then into system level instructions as set forth below:

indexOf:(Ljava/lang/String;)I ShowWeekdayR.main:
([Ljava/lang/String;)V,15 0
indexOf:(Ljava/lang/String;)I ShowWeekdayR.main:
([Ljava/lang/String;)V,38 0
indexOf:(Ljava/lang/String;)I ShowWeekdayR.main:
([Ljava/lang/String;)V,61 0
split: (Ljava/lang/String;)[Ljava/lang/String;
ShowWeekdayR.main:([Ljava/lang/String;)V,72 0
java/lang/Integer.parseInt:(Ljava/lang/String;)I
ShowWeekdayR.main:([Ljava/lang/String;)V,80 0
java/lang/Integer.parseInt:(Ljava/lang/String;)I
ShowWeekdayR.main:([Ljava/lang/String;)V,86 0

After converting both the library function code snippets and the candidate code snippets being analyzed, the fuzzy/internal matching engine 221 finds the similar code snippets at function level.

To provide additional match processing, the fuzzy/internal matching engine 221 may also be provided with an Ngram matching algorithm 223 for identifying validated code snippets from the input source code which match with library functions in the library knowledge base 202. In selected embodiments, the Ngram matching algorithm 223 may employ a contiguous sequence of n items formed from the ASM files which in turn are extracted from Class files to represent the internal structure of the candidate code snippets 215 and library function code snippets 206 from the library knowledge base 202 that are written in a source code programming language. In operation, the Ngram matching algorithm 223 extracts n-grams from a given candidate code snippet 215 for comparison with the Ngrams extracted from library function code snippets 206 from the library knowledge base 202. In selected embodiments, the Ngram matching algorithm 223 may be embodied with the Agec execution-semantic clone detection tool which analyzes the library function code snippets 206 and the candidate code snippets 215 being validated. In operation, the Ngram matching algorithm 223 applies an abstract interpretation to bytecode as a static analysis in order to generate n-grams from the candidate code snippets 215, detects the same n-grams from distinct places of the library function code snippets 206, and then reports these n-grams as code clones.

For improved accuracy for of the Ngram matching algorithm 223, the Ngram threshold value may be adjusted or tweaked for each different library function, and then stored while onboarding any new library function in the library knowledge base 202 for automated usage. As will be appreciated, the Ngram threshold value specifies the minimum number of Ngrams which need to be matched in order for the candidate code snippet to be validated. In accordance with the present disclosure, the Ngram threshold value for each library function may be calculated by finding the minimum of maximum number of Ngrams present in the library knowledge base 202. In addition, the Agec clone detection embodiment of the Ngram matching algorithm 223 may be modified to provide ASM-level operators and/or to add literals and parent function features for similar code detection. In other embodiments, the Agec clone detection tool used to implement the Ngram matching algorithm 223 may also be extended to work with input data types (such as array, Integer, String, etc.), to allow for multiple function invocations within the same file, and/or to auto generate custom inputs by extracting test cases from the library function test cases.

In selected embodiments, the AST matching algorithm 222 and Ngram matching algorithm 223 may be further modified for improved accuracy by adding a literal or constant Ngram to require a strict matching algorithm in cases where the literal constants play an important role for a code snippet to work similar to a library function. For example, when a removeExtension instruction has a literal constant of '•' which when replaced with something like '|' in the candidate code snippet be analyzed, then the matching algorithm should not yield a library substitution opportunity as removeExtension, even though most of the AST and Ngrams are similar with the library knowledge base 202.

Input/Output or Blackbox Matching

In addition to performing fuzzy/internal matching, the input/output matching engine 224 (also referred to as a "blackbox matching" engine) is configured to inject shared inputs into the candidate code snippets 215 and the library functions via JARs which are extracted via maven links presented in the library function information 206 to see if the candidate code snippet output is similar to the library function code snippet output. Based on the output similarity, the input/output matching engine 224 assigns a similarity rating. If the outputs match, the candidate code snippet 215 being analyzed is validated for possible replacement with the matching library function.

Continuing with an example use case scenario to illustrate how the input/output matching engine 224 injects a shared input into a candidate code snippet 215 and library function code snippet 206 to compare the output results, consider the example of the following input candidate code snippet 215 being compared at the input/output matching engine 224 is set forth below:

```
--code--
if (path.indexOf("\") == -1) {
    answer = path;
}
answer = path1;
--code--
```

At the input/output matching engine 224, this input candidate code snippet s converted to:

```
public java.lang.String testMethod(String testMethodInput_0, String testMethodInput_1) throws Exception {String path = testMethodInput_0;
    if (path.indexOf("\") == -1) {
        return path;
    }
    String returnTestMethodVar = testMethodInput_1;
    return returnTestMethodVar;
}
```

The input/output matching engine 224 may then use an interface program, such as Py4J, to pass inputs into this function, and the results are matched with corresponding library function results which are calculated by running jar with same parameters.

The main challenge for performing input/output matching is to extract the right code snippets for matching analysis. The performance of input/output matching at the function level of granularity rarely works since most of the library suggestion opportunities are hidden within code segments that are difficult to recognize. To address this limitation, the input/output matching engine 224 may be configured to check each and every code snippet line by treating them as start and end lines. While doing this, the code snippet AST is analyzed to maintain a symbol table. To this end, the input/output matching engine 224 may include a code snippet data extraction engine 225 which processes each and every line of the input candidate code snippet 215 to extract a code snippet data structure which includes information identifying the snippet code, snippet return type, snippet variables used, and snippet variable types. In addition to generating data structures from the input code snippets, the input/output matching engine 224 may process the library function information 206 with the library function data extraction engine 226 to extract predetermined information identifying the candidate library model, such as library function input parameters, return type, and the like. The input/output matching engine 224 may then use an interface program, such as Py4J, to pass inputs into the extracted code snippet and library function data structures, and the results are matched with corresponding library function results which are calculated by running the JAR with same parameters. To this end, the input/output matching engine 224 may process the extracted code snippet data structure with a template engine 227 which generates code snippet templates with an appropriate class with function definition for each extracted code snippet line. Based on the input code snippet and library function data structures being analyzed for suggestion, the input/output matching engine 224 identifies validated code snippets 229 having matching library functions by analyzing the extracted library function data structures against a templatized candidate code snippet by checking if the code snippet return type matches the return type of the library function and then generating a template for each candidate code snippet and checking the candidate code snippet to see if it is compilable. In generating a template for each candidate code snippet, the input/output matching engine 224 determines if the library function input parameters can fit in the variables being used by the candidate code snippet. If so, the input/output matching engine 224 replaces a generated template with a basic or generic type template for the candidate code snippet. If the candidate code snippet is compilable, a predetermined set of inputs is injected into the template for the candidate code snippet and the resulting output is checked against the library function outputs generated from the same inputs to see if the code snippet outputs are similar or identical to the outputs from the library function.

By combining and consolidating the outputs from the fuzzy/internal matching engine 221 and input/output matching engine 224, the matching engine 220 identifies validated code snippets with matching library functions 229 which are output as library reuse recommendations 240.

Presenting Library Function Recommendations

The results of the match processing by the matching engine 220 are presented to the programmer as one or more library function recommendations which may include code lines from input source code files (e.g., validated code snippets) along with code lines from the recommended library function. To assist the developer with the recommended library substitution, the developer may also be provided with additional library function information identifying the code improvement recommendation and/or code reduction resulting from the library function recommendation and/or educational tutorial information relating to the implementation of the library function recommendation.

Figure 3:
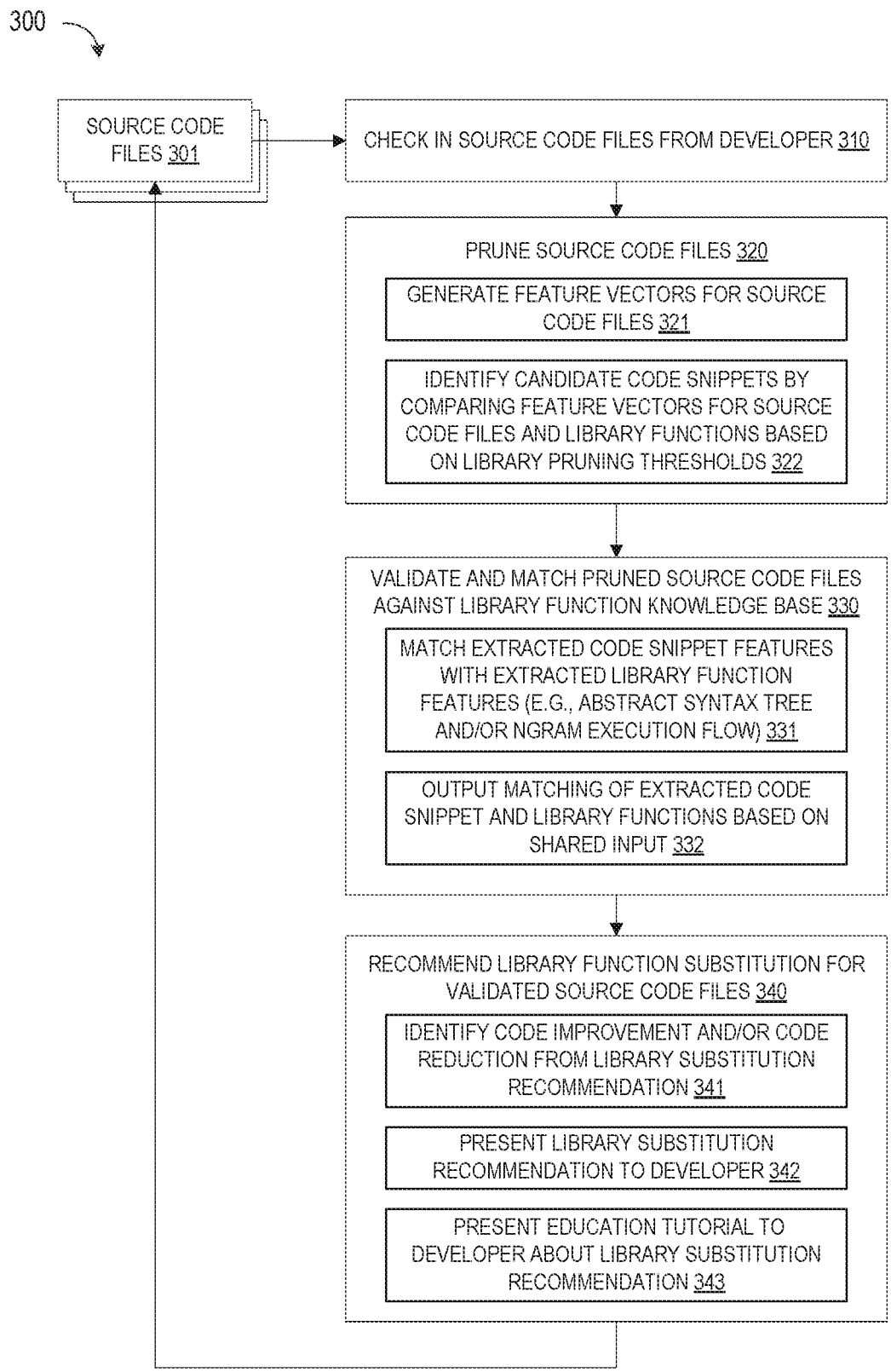
FIG. 3 illustrates a simplified flow chart showing the logic for recommending validated library function substitutions to a developer in accordance selected embodiments of the present disclosure.

To provide additional details for an improved understanding of selected embodiments of the present disclosure, reference is now made to FIG. 3 which depicts a simplified flow chart 300 showing the logic for recommending validated library function substitutions to a developer in accordance selected embodiments of the present disclosure. The processing shown in FIG. 3 may be performed by a cognitive system, such as the computing system 100 shown in FIG. 1 or other natural language processing system.

At step 301, source code files are written or retrieved by a developer, and then checked in or committed at step 310. At this point in the software development process, the source code includes untested code that may be fragile, bloated, untested, and low quality code which contains undiscovered bugs and is otherwise inefficient and not readily readable.

At step 320, input source code files are pruned or filtered to identify source code files that are likely candidates for library function suggestions while removing source code files that do not have certain keywords that are most likely to qualify for library function suggestions. The processing performed at step 320 may use machine learning, natural language processing, and/or artificial intelligence techniques to find keywords in the input source code files and then assign a priority or weight value. In selected embodiments, the pruning step 320 may be implemented with a feature vector generation step 321 which uses vector formation techniques to generate feature vectors for each input source code file. Using the generated feature vectors along with library function feature vectors retrieved from memory, candidate code snippets from the input source code files may be identified at step 322 by comparing the input source code file feature vectors and the library function feature vectors to generate a numerical similarity measure that may be compared with a pruning threshold values for the corresponding library function. The computation steps performed at step 322 to identify similarities between the feature vectors may include tokenizing input code snippets and code snippets from the library functions to generate comparative file vectors which are evaluated (e.g., by dot product) against a pruning threshold to identify candidate code snippets, checking for the presence of predetermined words in the input code and assigning a corresponding weight, or by any other suitable code filtering operations for identifying candidate code snippets from the input code that should be further processed for library suggestion opportunities.

At step 330, the pruned input source code files (e.g., candidate code snippets) are validated and matched with library function information contained in the knowledge base to identify validated source code files (e.g., validated code snippets). The processing performed at step 330 may use machine learning, natural language processing, and/or artificial intelligence techniques in combination with static and/or dynamic code analysis to identify and validate input source code files that likely qualify for library function suggestions. In selected embodiments, the validation and matching step 330 may be implemented with a first match processing step 331 which matches code snippet features extracted from an input source code file with extracted library function features, such as by using abstract syntax tree and/or Ngram execution flow matching algorithms. In effect, the first match processing step 331 performs fuzzy matching of the structural syntax and/or bytecode execution flow using automated matching threshold values (e.g., AST size and distance thresholds and/or Ngram thresholds).

In selected embodiments, the validation and matching step 330 may also include a second match processing step 332 which performs input/output matching by injecting shared inputs to input code snippets and library function code snippets to detect matching outputs, thereby generating validated code snippets which can be replaced by a library function. In effect, the second match processing step 332 performs exact matching to confirm that the code snippets are the same if the same input yields the same outputs. In selected embodiments, the second match processing step 332 may be configured to extract library signature information from a library function, and to then extract candidate code snippets. The extracted candidate code snippets may then be templated according to the extracted library signature and then compiled so that a shared input is injected into the compiled code to generate outputs which are compared to outputs generated from the library function on the basis of the shared input.

At step 340, the library function substitutions are recommended for each validated source code file (e.g., validated code snippets) so that the program developer is presented with one or more library function recommendations which include may include code lines from input source code files along with code lines from the library function suggestion, alone or in combination with additional library function information identifying the code improvement recommendation and/or code reduction resulting from the library function recommendation and/or educational tutorial information relating to the implementation of the library function recommendation. The processing performed at step 340 may be performed by a cognitive system, such as the computing system 100 shown in FIG. 1 or other data processing system functionality for displaying user interface information. In selected embodiments, the recommendation step 340 may be implemented with a first processing step 341 which identifies a code improvement and/or code reduction from the library substitution recommendation, such as by quantifying a performance benefit or potential code reduction that would result from using the library function recommendations. In addition, the recommendation step 340 may include a second processing step 342 which presents the library substitution recommendation to the developer, alone or in combination with information about a code improvement or code reduction. As will be appreciated, the library substitution recommendation presented at step 342 may be included in the same user interface screen or a different user interface screen in which the code improvements and/or code reductions are identified for the developer. In addition, the recommendation step 340 may include a third processing step 343 which presents the developer with an education tutorial about the library substitution recommendation, such as by displaying the recommended replacement code for recommended library function along an explanation of the benefits of the recommended library function, a link to the suggested library function, and a video explaining how to implement the suggested library function.

Figure 4A:
FIG. 4A is a first example screen shot of a user interface of a library suggestion engine which illustrates the evaluation of input source code files in accordance selected embodiments of the present disclosure.
Figure 4B:
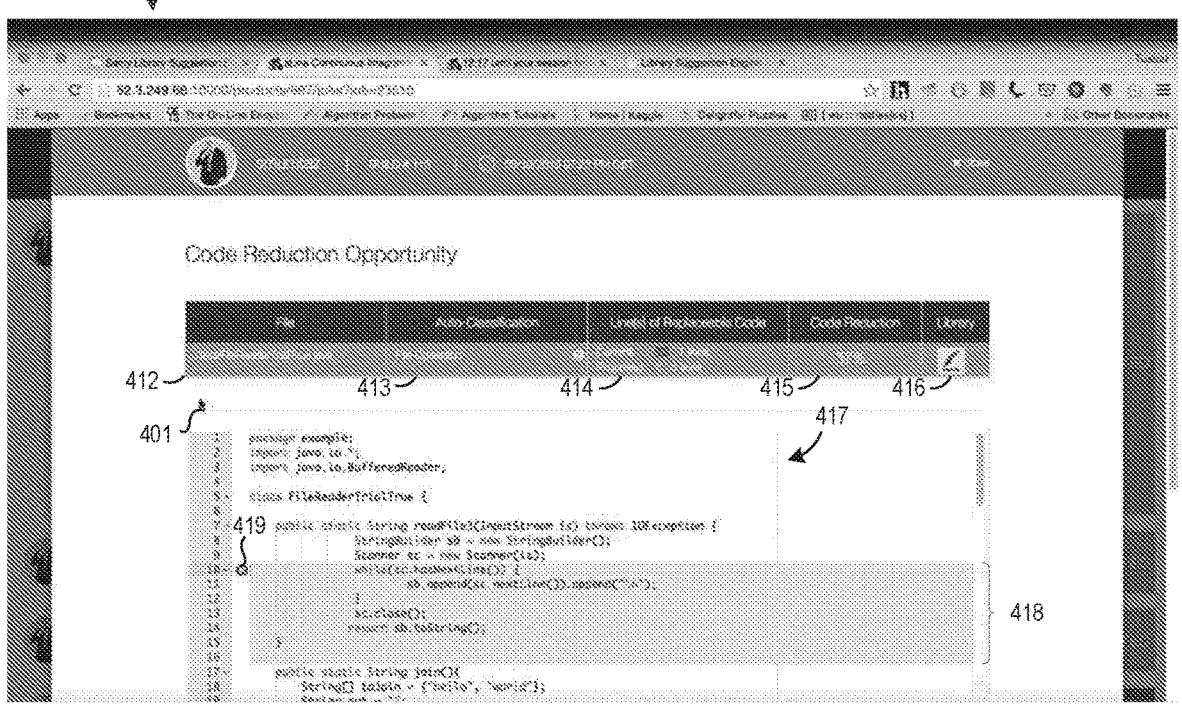
FIG. 4B is a second screen shot of a user interface of a library suggestion engine which illustrates a code reduction opportunity for an input source code file in accordance selected embodiments of the present disclosure.
Figure 4C:
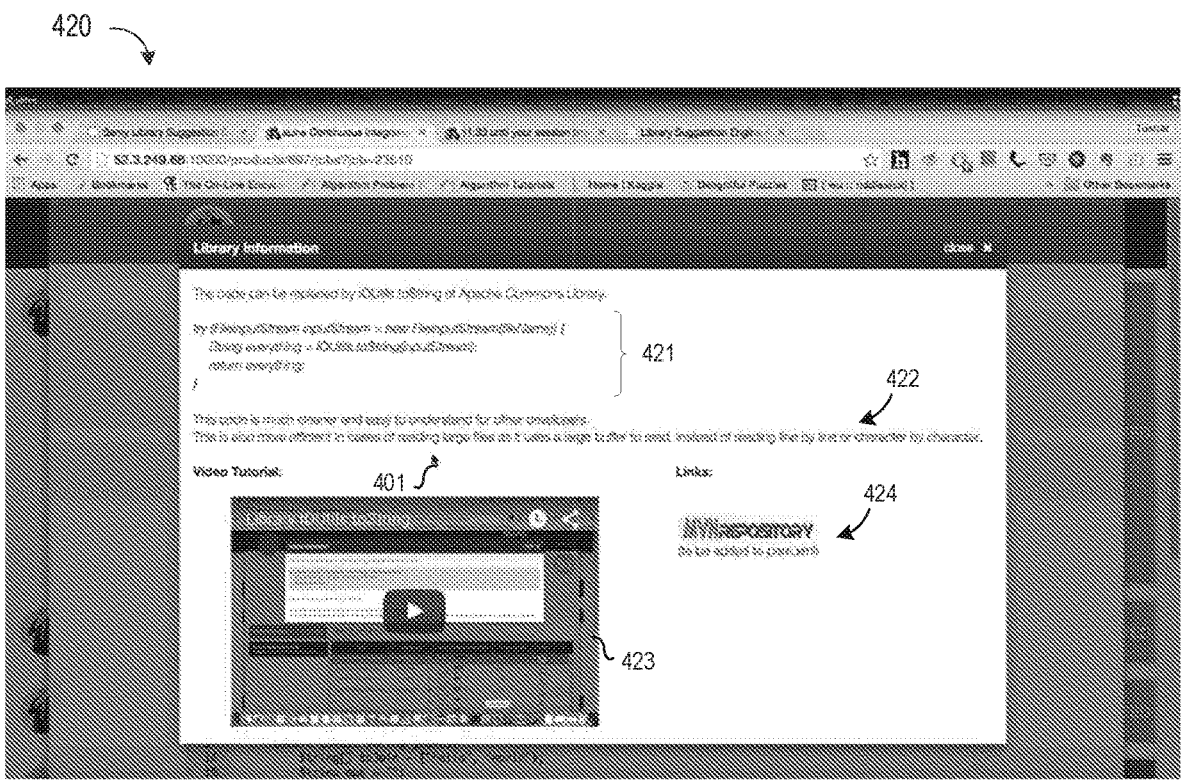
FIG. 4C is a third screen shot of a user interface of a library suggestion engine which illustrates a library function recommendation for an input source code file in accordance selected embodiments of the present disclosure.

To provide additional details for an improved understanding of selected embodiments of the present disclosure, reference is now made to FIGS. 4A-C which depict an example sequence of user interface screen shots for a library suggestion engine in accordance selected embodiments of the present disclosure. In the first example screen shot of user interface 400 shown in FIG. 4A, there is displayed is a shown a summary or overview for the evaluation of a plurality of input source code files for library suggestion recommendations. For example, the user interface 400 shows a build status report 402, code quality report 403, unit test report 405, and suggested library usage report 405 for a first input source code file (Build #113, Rev 4141) that has been committed or loaded into the library suggestion engine. As indicated in the library usage report 405, the user interface 400 indicates that one issue has been detected and that the recommended library function will reduce the size of the source code by four lines if selected by the developer for substitution or replacement.

By using the cursor 401 or other user interface controls to interact with the user interface 400, the developer may cause the library suggestion engine to display a second user interface screen shot 410 which illustrates a code reduction opportunity for the selected input source code file, as illustrated in FIG. 4B. In this example, the user interface 410 shows a file identification field 412 for the first input source code file (e.g., Build #113, Rev 4141), an auto-classification field 413, code line replacement field 414, a code reduction field 415, and a library field 416. The file identification field 412 identifies the input source code file. The auto-classification field 413 automatically shows that the first input source code file is a "file operation" file. The code line replacement field 414 shows the number of current code lines (in the validated code snippet) and the proposed number of code lines (from using the recommended library function). The code reduction field 415 shows a quantification of the code reduction benefit. And the library field 416 provides a link to additional information for educating the developer about how to implement the recommended library function. Below the fields 412-416, the second user interface screen shot 410 may also display the first input source code file 417 with the validated code snippet 418 highlighted or otherwise visually set off from the remaining lines of code in the input source code file 417. In order to access additional information relating to the recommended library function, the user interface 410 may include one or more user interaction links 419 in addition to the library field 416 so that, when actuated by the cursor 401, additional information about the recommended library function may be displayed.

Referring now to FIG. 4C, there is shown a third user interface screen shot 420 which illustrates additional library information 421-424 relating to the recommended library function for replacing the validated code snippet 418. In this example, the user interface 420 shows a first field 421 for identifying library code (e.g., IOUtils.toString of the Apache Commons Library) that can be used to replace the validated code snippet 418. The user interface 420 may also include a second field 422 for describing the benefits of using the library function recommendation. The user interface 420 may also include a video tutorial 423 and a link 424 to the library repository MVN Repositorymaven repository). The video tutorial 423 can provide educational information to the programmer on how to replace the validated code snippet with the recommended library function and other information needed to migrate to the recommended library function.

Figure 5:
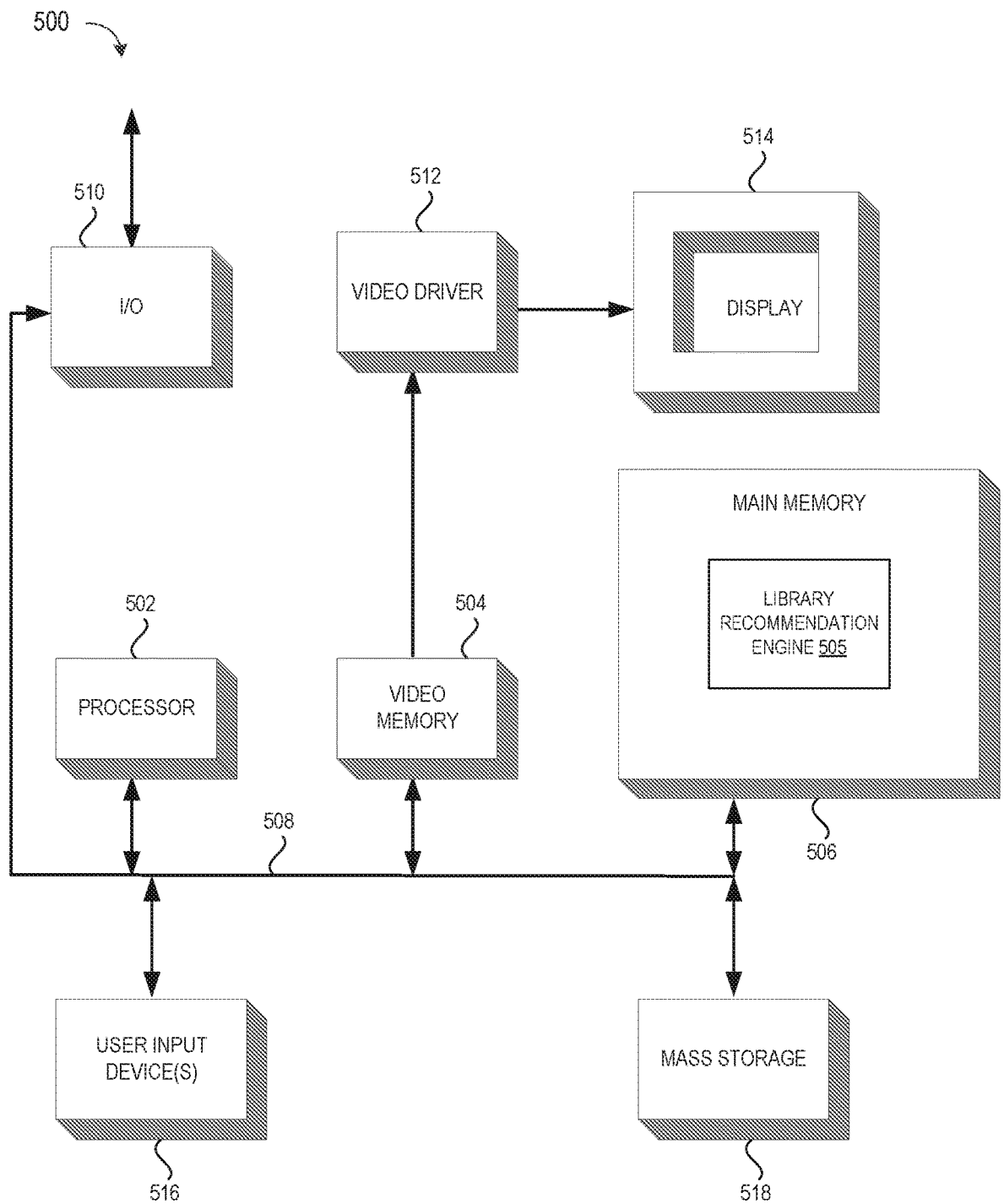
FIG. 5 is a simplified block diagram of a general-purpose computer in accordance with selected embodiments of the present disclosure.

Embodiments of the system and method for recommending library substitutions can be implemented on a computer system, such as a general-purpose computer 500 illustrated in FIG. 5. As disclosed the computer 500 includes input user device(s) 516, such as a keyboard and/or mouse, which are coupled to a bi-directional system bus 508. The input user device(s) 516 are used for introducing user input to the computer system 500 and communicating that user input to processor 502. The computer system 500 may also include a video memory 504, main memory 506, and mass storage 518, all coupled to bi-directional system bus 508 along with input user device(s) 516 and processor 502. The mass storage 518 may include both fixed and removable media, such as other available mass storage technology. Bus 508 may contain, for example, 32 address lines for addressing video memory 504 or main memory 506. The system bus 508 may also include, for example, an n-bit data bus for transferring data between and among the components, such as CPU 502, main memory 506, video memory 514, and mass storage 518, where "n" is, for example, 32 or 64. Alternatively, multiplex data/address lines may be used instead of separate data and address lines.

The computer 500 may also include I/O device(s) 510 which provide connections to peripheral devices, such as a printer, and may also provide a direct connection to remote server computer systems via a telephone link or to the Internet via an ISP. I/O device(s) 510 may also include a network interface device to provide a direct connection to remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 518 until loaded into main memory 506 for execution. Computer programs may also be in the form of electronic signals modulated in accordance with the computer program and data communication technology when transferred via a network. The method and functions relating to system and method for generating library suggestions may be implemented in a computer program for a library recommendation engine 505.

The processor 502, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 506 is comprised of dynamic random access memory (DRAM). Video memory 504 is a dual-ported video random access memory. One port of the video memory 504 is coupled to video amplifier or driver 512. The video amplifier 512 is used to drive the display 514. Video amplifier 512 is well known in the art and may be implemented by any suitable means. This circuitry converts pixel data stored in video memory 504 to a raster signal suitable for use by display 514. Display 514 is a type of monitor suitable for displaying graphic images.

By now, it will be appreciated that there is disclosed herein a system, method, apparatus, and computer program product for enhancing operable functionality of a software program by performing a method at a device having an operating system and system library. As disclosed, the system, method, apparatus, and computer program receive a plurality of input source code files from the software program submitted by a developer, such as by committing, to a library suggestion engine, source code and binary files for the software program. Subsequently, one or more candidate code snippets are identified from the plurality of input source code files. In selected embodiments, the candidate code snippets are identified by pruning the input source code files with an NLP analysis of the input source code files to keep each candidate code snippet which meets at least a first similarity threshold measure for a first library function stored in the system library. From the identified candidate code snippets, at least a first code snippet and first library function are identified that generate similar outputs from a shared input by parsing each and every line of code in a candidate code snippet to generate a templatized code snippet data structure for the first code snippet, and then testing the templatized code snippet data structure against extracted library function information to check for similarity of outputs between the first code snippet and the first library function in response to the shared input. In selected embodiments, the parsing of each and every line of code in the candidate code snippet may use a python language parser to analyze an abstract syntax tree measure for each line of code in the candidate code snippet. For example, the python language parser may be implemented with a PlyJ AST parser in which FieldDeclarationVisitor, StatementVisitor, and VariableDeclarationVisitor classes are modified to parse information about line numbers in the abstract syntax tree measure. In addition, the templatized code snippet data structure may be tested by checking the templatized code snippet data structure for compilability, injecting the shared input into the templatized code snippet data structure and the first library function, and checking if outputs generated by the templatized code snippet data structure and first library function meet a similarity threshold requirement. In other embodiments, the first code snippet may be identified by performing machine learning and natural language processing in combination with code analysis techniques to implement an input/output matching algorithm for selecting a candidate code snippet which generates the same output as the first library function when both are injected with the shared input. Finally, the developer is presented with a library function recommendation which includes the first code snippet, the first library function, and instructions for replacing the first code snippet with the first library function. In selected embodiments, the library function recommendation may be presented by displaying on one or more user interface screens the first code snippet, the first library function, and instructions for educating the developer on how to replace the first code snippet with the first library function.

The present invention may be a system, a method, and/or a computer program product such that selected embodiments include software that performs certain tasks. The software discussed herein may include script, batch, or other executable files. The software may be stored on a machine-readable or computer-readable storage medium, and is otherwise available to direct the operation of the computer system as described herein and claimed below. In one embodiment, the software uses a local or database memory to implement the data transformation and data structures so as to automatically detect library substitution opportunities, improve the quality and robustness of software, educate developers about library opportunities and implementation and generate more readable, reliable, smaller, and robust code with less effort. The local or database memory used for storing firmware or hardware modules in accordance with an embodiment of the invention may also include a semiconductor-based memory, which may be permanently, removably or remotely coupled to a microprocessor system. Other new and various types of computer-readable storage media may be used to store the modules discussed herein. Additionally, those skilled in the art will recognize that the separation of functionality into modules is for illustrative purposes. Alternative embodiments may merge the functionality of multiple software modules into a single module or may impose an alternate decomposition of functionality of modules. For example, a software module for calling sub-modules may be decomposed so that each sub-module performs its function and passes control directly to another sub-module.

In addition, selected aspects of the present invention may take the form of an entirely hardware embodiment, an entirely software embodiment (including firmware, resident software, micro-code, etc.), or an embodiment combining software and/or hardware aspects that may all generally be referred to herein as a "circuit," "module" or "system." Furthermore, aspects of the present invention may take the form of computer program product embodied in a computer readable storage medium or media having computer readable program instructions thereon for causing a processor to carry out aspects of the present invention. Thus embodied, the disclosed system, a method, and/or a computer program product is operative to improve the design, functionality and performance of software programs by automatically detecting and recommending library function substitutions for replacing validated code snippets in the software program.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing, A computer readable storage medium, as used herein, is not to be construed as being transitory signals per se, such as radio waves or other freely propagating electromagnetic waves, electromagnetic waves propagating through a waveguide or other transmission media light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Visual Basic.net, Ruby, Smalltalk, C++ or the like, and conventional procedural programming languages, such as the "C" programming language, Hypertext Precursor (PHP), or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system described above is for purposes of example only, and may be implemented in any type of computer system or programming or processing environment, or in a computer program, alone or in conjunction with hardware. Various embodiments of the present may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. The system and method for generating library suggestions may be implemented in any type of computer system or programming or processing environment. It is contemplated that the system and method for generating library function recommendations might be run on a stand-alone computer system, such as the one described above. The system and method for generating library suggestions might also be run from a server computer systems system that can be accessed by a plurality of client computer systems interconnected over an intranet network. Finally, the system and method for generating library suggestions projects may be run from a server computer system that is accessible to clients over the Internet.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method performed by a device having an operating system and a system library for enhancing operable functionality of a software program, comprising:
    executing first code in a first computer system, wherein executing the first code causes the first computer system to perform operations comprising:
        sending a plurality of input source code files from a software program to a second computer system; and
        receiving a library function recommendation comprising a first library function, and instructions for replacing a first code snippet in the source files with the first library function, wherein the second computer system executes second code, wherein executing the second code causes the second computer system to perform operations comprising;
        receiving the plurality of input source code files from the first computer system;
        identifying one or more candidate code snippets from the plurality of input source code files;
        identifying at least a first code snippet and a first library function which generate similar outputs from a shared input by parsing each and every line of code in a candidate code snippet to generate a templatized code snippet data structure for the first code snippet, and then testing the templatized code snippet data structure against extracted library function information to check for similarity of outputs between the first code snippet and the first library function in response to the shared input; and
        presenting, to the developer, the library function recommendation comprising the first code snippet, the first library function, and the instructions for replacing the first code snippet with the first library function.

2. The method of claim 1, where receiving the plurality of input source code files comprises committing to a library suggestion engine source code and binary files for the software program.

3. The method of claim 1, where identifying one or more candidate code snippets comprises pruning the plurality of input source code files by performing natural language processing analysis of the plurality of input source code files to keep each candidate code snippet which meets at least a first similarity threshold measure for a first library function stored in the system library.

4. The method of claim 1, where identifying the first code snippet comprises performing machine learning and natural language processing in combination with code analysis techniques to implement an input/output matching algorithm for selecting a candidate code snippet which generates the same output as the first library function when both are injected with the shared input.

5. The method of claim 1, where parsing each and every line of code in the candidate code snippet comprises using a python language parser to analyze an abstract syntax tree measure for each line of code in the candidate code snippet.

6. The method of claim 5, where the python language parser comprises a PlyJ AST parser in which FieldDeclarationVisitor, StatementVisitor, and VariableDeclarationVisitor classes are modified to parse information about line numbers in the abstract syntax tree measure.

7. The method of claim 1, where testing the templatized code snippet data structure comprises checking the templatized code snippet data structure for compilability, injecting the shared input into the templatized code snippet data structure and the first library function, and checking if outputs generated by the templatized code snippet data structure and first library function meet a similarity threshold requirement.

8. The method of claim 1, where presenting the library function recommendation comprises displaying on one or more user interface screens the first code snippet, the first library function, and instructions for educating the developer on how to replace the first code snippet with the first library function.

* * * * *